US009715381B2

(12) United States Patent
Tokunaga et al.

(10) Patent No.: US 9,715,381 B2
(45) Date of Patent: *Jul. 25, 2017

(54) INFORMATION PROCESSING APPARATUS, INFORMATION PROCESSING SYSTEM, INFORMATION PROCESSING METHOD, AND NON-TRANSITORY COMPUTER-READABLE STORAGE MEDIUM HAVING STORED THEREIN AN INFORMATION PROCESSING PROGRAM

(71) Applicant: NINTENDO CO., LTD., Kyoto (JP)

(72) Inventors: Eiji Tokunaga, Kyoto (JP); Yoichi Ohshima, Kyoto (JP); Tsuyoshi Kurita, Kyoto (JP); Shinobu Suzuki, Kyoto (JP); Yu Horii, Kyoto (JP); Shumpei Yasuda, Kyoto (JP); David Tran, Redmond, WA (US); Eugene Borisov, Redmond, WA (US); Craig MacDonald, Redmond, WA (US)

(73) Assignee: NINTENDO CO., LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/147,145

(22) Filed: May 5, 2016

(65) Prior Publication Data

US 2016/0246589 A1 Aug. 25, 2016

Related U.S. Application Data

(63) Continuation of application No. 14/287,677, filed on May 27, 2014, now Pat. No. 9,361,091.

(51) Int. Cl.
*G06F 9/44* (2006.01)
*G06F 9/445* (2006.01)
(Continued)

(52) U.S. Cl.
CPC .............. *G06F 8/65* (2013.01); *G06F 1/3234* (2013.01); *G06F 1/3296* (2013.01); *H04L 67/02* (2013.01); *Y02B 60/183* (2013.01)

(58) Field of Classification Search
None
See application file for complete search history.

(56) References Cited

U.S. PATENT DOCUMENTS

| | | | | |
|---|---|---|---|---|
| 5,644,594 A * | 7/1997 | Johnson | .................... | G06F 8/65 375/222 |
| 6,341,143 B1 * | 1/2002 | Nelson | ...................... | G06F 8/65 375/222 |

(Continued)

FOREIGN PATENT DOCUMENTS

| | | |
|---|---|---|
| EP | 1 300 761 | 4/2003 |
| JP | 2007-281810 | 10/2007 |

(Continued)

OTHER PUBLICATIONS

European Search Report issued in Application No. 15164800 dated Aug. 20, 2015.

*Primary Examiner* — Chameli Das
(74) *Attorney, Agent, or Firm* — Nixon & Vanderhye P.C.

(57) ABSTRACT

An object is to provide an information processing apparatus and the like that can reduce power consumption of the information processing apparatus in downloading and installing. To achieve this object, whether or not there is system software update is confirmed in a low power consumption state in which only some of hardware components of the information processing apparatus are supplied with power and communication with a predetermined server can be performed. When there is the update, update data is downloaded, and at least some of the hardware components that are the update targets and that are not supplied with power in the low power consumption state are started to be (Continued)

supplied with power. Then, system update is executed. The series of processes are automatically executed without a user's operation.

19 Claims, 9 Drawing Sheets

(51) Int. Cl.
*H04L 29/08* (2006.01)
*G06F 1/32* (2006.01)

(56) References Cited

U.S. PATENT DOCUMENTS

| | | |
|---|---|---|
| 8,261,258 B1* | 9/2012 | Jianu .............................. 717/169 |
| 2006/0166739 A1* | 7/2006 | Lin .......................... A63F 13/12 |
| | | 463/39 |
| 2007/0236734 A1 | 10/2007 | Okamoto |
| 2008/0119281 A1 | 5/2008 | Hirose |
| 2011/0307884 A1* | 12/2011 | Wabe ........................ G06F 8/60 |
| | | 717/178 |
| 2011/0321031 A1* | 12/2011 | Dournov ............. G06F 9/45533 |
| | | 717/171 |
| 2012/0272084 A1* | 10/2012 | Tsuji ....................... G06F 8/665 |
| | | 713/324 |
| 2013/0123022 A1 | 5/2013 | Wabe et al. |
| 2015/0347117 A1 | 12/2015 | Tokunaga et al. |

FOREIGN PATENT DOCUMENTS

| | | |
|---|---|---|
| JP | 2010-009474 A | 1/2010 |
| JP | 2012-018657 | 1/2012 |
| JP | 2013-103029 | 5/2013 |

* cited by examiner

F I G. 5

| | OPERATION MODE | | | |
|---|---|---|---|---|
| | NORMAL MODE | SYSTEM UPDATE MODE | LOW POWER CONSUMPTION MODE | STANDBY MODE |
| CPU | TRIPLE-CORE OPERATION | TRIPLE-CORE OPERATION | SINGLE-CORE OPERATION | OFF |
| GPU | ON | ON | OFF | OFF |
| MAIN MEMORY | ON | ON | ON | OFF |
| FLASH MEMORY | ON | ON | ON | OFF |
| CONTROLLER COMMUNICATION SECTION | ON | ON | MIDDLE (ONLY POWER-ON OPERATION IS ACCEPTABLE) | MIDDLE (ONLY POWER-ON OPERATION IS ACCEPTABLE) |
| WIRELESS COMMUNICATION SECTION | ON | ON | ON | OFF |
| POWER SUPPLY CONTROL SECTION | ON | ON | ON | ON |
| TELEVISION | ON | OFF | OFF | OFF |
| DISC DRIVE | ON | OFF | OFF | OFF |
| COOLING FAN | ON | ON | MIDDLE (LOW-SPEED ROTATION) | OFF |
| OPERATION MODE INDICATED BY LIGHTING CONDITION OF LED | NORMAL MODE | LOW POWER CONSUMPTION MODE | LOW POWER CONSUMPTION MODE | STANDBY MODE |

INFORMATION PROCESSING APPARATUS, INFORMATION PROCESSING SYSTEM, INFORMATION PROCESSING METHOD, AND NON-TRANSITORY COMPUTER-READABLE STORAGE MEDIUM HAVING STORED THEREIN AN INFORMATION PROCESSING PROGRAM

This application is a continuation of application Ser. No. 14/287,677, filed May 27, 2014 the entire contents of which are hereby incorporated by reference.

FIELD

The exemplary embodiments relate to an information processing apparatus capable of communicating with an external apparatus via a network, and more specifically, to system update processing in a low power consumption state.

BACKGROUND AND SUMMARY

Conventionally, there is known an information processing apparatus capable of automatically downloading predetermined data such as an application and also installing the downloaded data.

In such an information processing apparatus as described above, in terms of power consumption (operation mode) of the information processing apparatus, power consumption in downloading and power consumption in installing are almost the same.

Therefore, the exemplary embodiments will describe an information processing apparatus and the like that can further reduce power consumption in the information processing apparatus in automatic downloading and installing, and also, can improve convenience in downloading and installing.

Configuration examples for achieving the above will be shown below.

One configuration example is an information processing apparatus capable of communicating with an external apparatus via a network. The information processing apparatus is capable of operating while switching between at least two operation states of a low power consumption state in which only some of hardware components composing the information processing apparatus are supplied with power and communication with a predetermined server can be performed, and a normal usage state in which more of the hardware components than in the low power consumption state are supplied with power and power consumption is greater than in the low power consumption state. The information processing apparatus includes updating confirmation means, updating preparation means, and updating install means. The update confirmation means confirms whether or not there is at least one update of system software that requires writing on the hardware components, in the low power consumption state. The update preparation means, when there is the update, executes processing of downloading update data for the update from the predetermined server, and starts supplying power to at least some of the hardware components that are not supplied with power in the low power consumption state. The update install means executes system update install, based on the downloaded update data. A series of processes by the update confirmation means, the update preparation means, and the update install means is automatically executed without a user's operation.

The above configuration example makes it possible to execute system update processing in an information processing apparatus while suppressing power consumption of the information processing apparatus, and enhance convenience for a user.

In another configuration example, the update preparation means may start supplying power to a hardware component that is not supplied with power in the low power consumption state and that is a writing target of the update, and the update install means may execute system update install accompanied with writing for the hardware component supplied with power by the update preparation means.

The above configuration example makes it possible to execute system update that requires writing for a hardware component while suppressing power consumption of the information processing apparatus.

In another configuration example, processing by the update preparation means may be executed in the low power consumption state.

The above configuration example can further reduce power consumption of the information processing apparatus.

In another configuration example, after system update install by the update install means is finished, the information processing apparatus may start its operation with an updated system, without requiring a user's operation.

The above configuration example can enhance convenience for a user.

In another configuration example, the information processing apparatus may further include shutdown means for executing processing of shutting down the information processing apparatus after update install by the update install means. Further, after the information processing apparatus is shut down by the shutdown means, the information processing apparatus may automatically switch its operation state to the low power consumption state.

The above configuration example makes it possible to perform system update and also restart after the system update while suppressing power consumption of the information processing apparatus. Further, after system update has been performed once, check processing for update that can occur thereafter can be executed subsequently, and automatic download and update install processing for the update can be performed.

In another configuration example, the information processing apparatus may further include: operation reception means for receiving, from a user, an instruction operation for switching the operation state of the information processing apparatus from a state other than the normal usage state to the normal usage state, based on a user's operation; and normal state shifting means for switching the operation state of the information processing apparatus to the normal usage state in response to the instruction operation received by the operation reception means during the series of processes being performed by the update confirmation means, the update preparation means, and the update install means. The information processing apparatus may further include: download interruption means for, while the download is being performed in the low power consumption state, when the operation reception means receives the instruction operation from the user, interrupting the download processing; and restart means for restarting the interrupted download after the operation state becomes the normal usage state. The restart means may restart the download as background processing, after the operation state becomes the normal usage state. During system update install processing by the update install means, when the operation reception means receives the instruction operation from the user, the normal state shifting means may switch the operation state to the normal usage state while continuing the system update install processing.

In the above configuration example, since download processing is interrupted once and is restarted thereafter, convenience for a user is ensured, and meanwhile, important processing such as system update can be swiftly completed.

In another configuration example, during the series of processes by the update confirmation means, the update preparation means, and the update install means, the information processing apparatus may not output to the external apparatus a video/audio signal relevant to the series of processes.

In the above configuration example, processing for system update can be performed without a user noticing that the processing is being performed.

In another configuration example, software as a target of the update may include a first kind of software and a second kind of software, the update confirmation means may include determination means for determining both whether or not there is update of the first kind of software and whether or not there is update of the second kind of software, and the processes by the update preparation means and the update install means may be executed when it is determined that there is update of the first kind of software. The system software may belong to the first kind of software, and an application other than the system software may belong to the second kind of software.

In the above configuration example, for example, only when update for system software occurs, power feed needed for the update is performed. Therefore, as a whole, power consumption of the information processing apparatus can be further reduced.

According to the exemplary embodiments, it becomes possible to further reduce power consumption of the information processing apparatus in downloading and installing system update, and also improve convenience in downloading and installing.

BRIEF DESCRIPTION OF THE DRAWINGS

FIG. 5 is a diagram showing an example of a power-feed on/off condition and an operation condition of each hardware component of the game apparatus 3;

DESCRIPTION OF EMBODIMENTS

Hereinafter, an exemplary embodiment will be described. In the exemplary embodiment, a stationary game system will be shown as an example of an information processing system.

[1. Entire Configuration of Game System]

Figure 1:
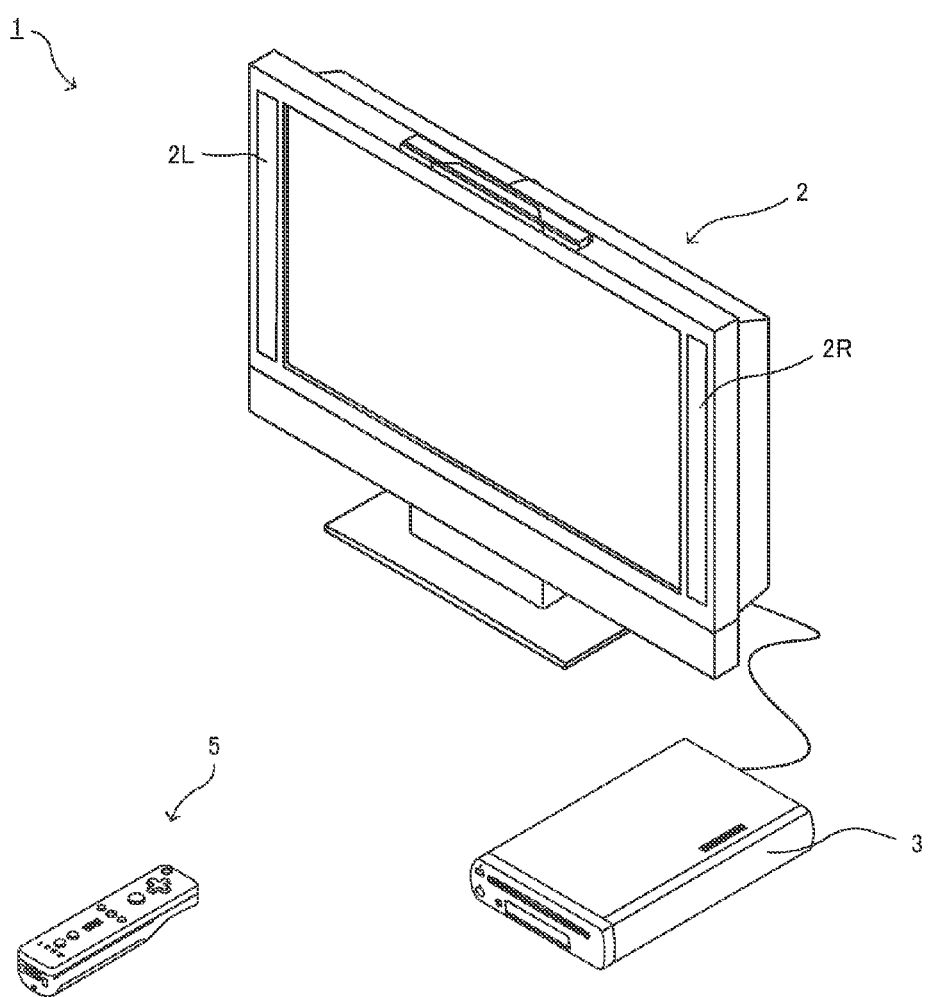
FIG. 1 is a schematic diagram showing the entire game system according to an exemplary embodiment.

FIG. 1 is an external view of a game system 1. In FIG. 1, the game system 1 includes a stationary display device (hereinafter, referred to as a "television") 2 typified by a television receiver or the like, a stationary game apparatus 3, an optical disc 4, and a controller 5. The game system 1 executes game processing in the game apparatus 3, based on a game operation by the controller 5, and displays a game image obtained by the game processing on the television 2.

The game apparatus 3 allows the optical disc 4 to be inserted therein in a detachable manner. The optical disc 4 is an example of an information storage medium used in an exchangeable manner for the game apparatus 3. The optical disc 4 has stored therein an information processing program (typically, a game program) to be executed in the game apparatus 3. The game apparatus 3 has an insertion slot for the optical disc 4, at its front surface. The game apparatus 3 reads and executes an information processing program stored in the optical disc 4 inserted into the insertion slot, thereby executing game processing.

The game apparatus 3 allows the television 2 to be connected thereto via a connection cord. The television 2 displays a game image obtained by image processing executed in the game apparatus 3. The television 2 has speakers 2L and 2R. The speakers 2L and 2R output a game sound obtained as a result of the game processing. In another exemplary embodiment, the game apparatus 3 and the stationary display device may be integrated. In addition, communication between the game apparatus 3 and the television 2 may be wireless communication.

The controller 5 gives operation data indicating the content of an operation performed on itself, to the game apparatus 3. The controller 5 and the game apparatus 3 can communicate with each other by predetermined wireless communication. In another exemplary embodiment, the controller 5 and the game apparatus 3 may be connected by wire.

[2. Internal Configuration of Game Apparatus 3]

Figure 2:
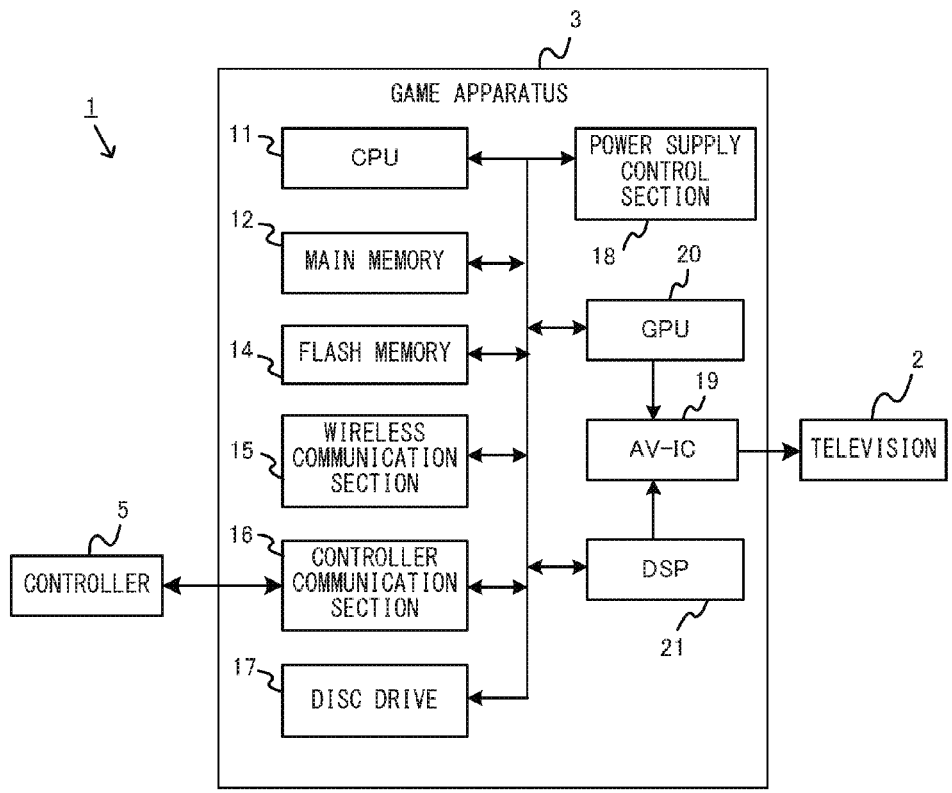
FIG. 2 is a block diagram showing an example of the configuration of a game apparatus 3.

Next, with reference to FIG. 2, the internal configuration of the game apparatus 3 will be described. FIG. 2 is a block diagram showing the internal configuration of the game apparatus 3. The game apparatus 3 includes a CPU (Central Processing Unit) 11, a main memory 12, a flash memory 14, a wireless communication section 15, a controller communication section 16, a disc drive 17, a power supply control section 18, an AV-IC 19, a GPU 20, a DSP 21, and the like.

The CPU 11 executes a game program or the like stored in the optical disc 4, thereby executing game processing, and thus functions as a game processor. In the exemplary embodiment, the CPU 11 is a so-called multi-core processor. Specifically, the CPU 11 is a triple-core processor. As a matter of course, in another exemplary embodiment, the core number is not limited to three, or not limited to multi-core.

The main memory 12, the flash memory 14, the wireless communication section 15, the controller communication section 16, the disc drive 17, the power supply control section 18, the GPU 20, and the DSP 21 are connected to the CPU 11. In addition, the GPU 20 and the DSP 21 are connected also to the AV-IC 19. The volatile main memory 12 is used for storing programs such as a game program read from the optical disc 4 and a game program read from the flash memory 14, and for storing various kinds of data, and is used as a working area or a buffer area of the CPU 11. The disc drive 17 reads program data or the like from the optical disc 4, and writes the read data into the main memory 12.

The GPU 20 forms a part of drawing means and generates an image in accordance with a graphics command (drawing command) from the CPU 11.

The DSP 21 functions as an audio processor and generates audio data by using sound data or sound waveform (tone) data stored in the external main memory 12.

Among images and sounds generated by the game apparatus 3 as described above, data of an image and a sound to be outputted from the television 2 is read by the AV-IC 19. The AV-IC 19 outputs the read image data to the television 2 via an AV connector (not shown), and outputs the read sound data to the speakers 2L and 2R provided in the television 2. Thus, an image is displayed on the television 2 and a sound is outputted from the speakers 2L and 2R.

The game apparatus 3 is capable of communicating with an external information processing apparatus (for example, another game apparatus, various servers, etc.) by being connected to a network such as the Internet. That is, the CPU 11 can be connected to a network such as the Internet via the wireless communication section 15, and communicate with an external information processing apparatus connected to the network. The CPU 11 periodically accesses the flash memory 14 and detects whether or not there is data to be transmitted to the network. If there is such data, the CPU 11 transmits the data to the network via the wireless communication section 15. In addition, the CPU 11 receives data transmitted from an external information processing apparatus or data downloaded from a predetermined server, via the network and the wireless communication section 15, and stores the received data into the flash memory 14.

In addition, the game apparatus 3 is capable of receiving operation data from the controller 5 via the controller communication section 16. That is, the CPU 11 receives operation data transmitted from the controller 5, via the controller communication section 16, and stores (temporarily) the operation data into the main memory 12. In the exemplary embodiment, the controller communication section 16 has two operation modes. One is a normal operation mode for performing normal operation, and the other one is a low power mode for performing operation with low power. As will be described in detail later, when the game apparatus 3 operates in a normal mode, the controller communication section 16 operates in the normal operation mode. In addition, when the game apparatus 3 operates in a low power consumption mode, the controller communication section 16 becomes the low power mode. In the low power mode, the controller communication section 16 accepts only an operation on a power button provided in the controller 5.

The power supply control section 18 includes an RTC (Real Time Clock) and can measure time. Time measured by the power supply control section 18 is used for changing the operation mode of the game apparatus 3 described later in accordance with a predetermined time schedule. In addition, the power supply control section 18 controls power feeding to each section of the game apparatus 3. For example, the power supply control section 18 controls boot of the CPU 11, based on the measured time.

In the exemplary embodiment, the game apparatus 3 (each section thereof) operates by power acquired from an external power source. The power supply control section 18 feeds power from an external power source to each section of the game apparatus 3. For example, the game apparatus 3 may acquire power via an AC adapter (not shown) from a home power supply. In another exemplary embodiment, the game apparatus 3 may operate by power acquired from an internal power source (such as a battery).

Further, although not shown, hardware components (modules) other than the above components are also mounted (for example, Bluetooth (registered trademark) module and the like). Here, such hardware components include the one having a chip (microcomputer) on which a control program for controlling the component is written. In addition, such a chip is configured to be rewritable. In the exemplary embodiment, as a part of system update processing, rewriting of such a chip is also performed.

Figure 3:
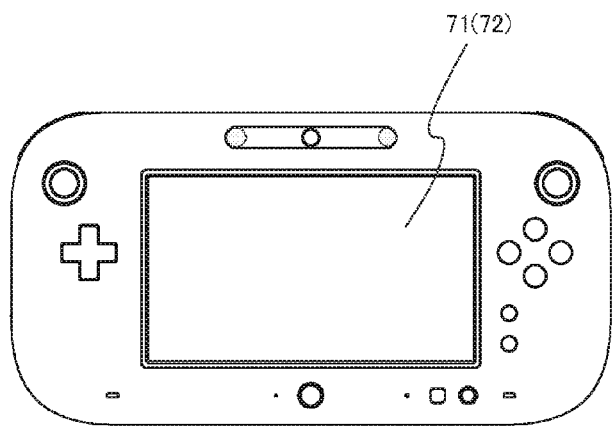
FIG. 3 shows an example of a controller.

Next, the controller 5 will be described. The controller 5 shown in FIG. 1 is wirelessly connected to the game apparatus 3. The controller 5 has a plurality of operation buttons to receive various operations from a user. Instead of such a controller as shown in FIG. 1, a controller having an LCD 71 and a touch panel 72 may be used as shown in FIG. 3, for example.

Next, the summary of operation of information processing executed by the game apparatus 3 according to the exemplary embodiment will be described. The processing according to the exemplary embodiment is, mainly, processing of performing system update while power of the game apparatus 3 is off. Regarding a method for acquiring update data for system update, in the exemplary embodiment, the game apparatus 3 acquires update data by downloading the update data from a predetermined server. That is, the game apparatus 3 queries a predetermined server whether or not there is some update data. Then, if there is such update data, the game apparatus 3 downloads the update data (in the exemplary embodiment, at the same time, also queries whether or not there is some update of an application other than a system). Then, the game apparatus 3 performs system update by using the downloaded update data.

First, the operation state (operation mode) of the game apparatus 3 in the exemplary embodiment will be described. First, from a user's viewpoint, operation states of the game apparatus 3 in the exemplary embodiment include a state (hereinafter, power-on state) in which power is on and a state (hereinafter, power-off state) in which power is off. The power-on state may be considered to be a state in which the game apparatus 3 is being used, mainly when a user is playing a game, for example. In other words, the power-on state is such a state that a user can recognize that power of the game apparatus 3 is on. On the other hand, the power-off state is such a state that allows a user to recognize that "power is off" and also allows supply of AC power. That is, in this state, an AC adapter or the like is plugged in, or in the case where the game apparatus 3 is a type that operates by a battery, the remaining battery level is more than the minimum required level for operation of the game apparatus 3.

The operation mode of the game apparatus 3 in a power-on state is referred to as a normal mode. The normal mode is a state in which power is supplied to all the hardware components. Also, a video signal and an audio signal are outputted to the television 2.

On the other hand, operation modes (in other words, power feed conditions of the game apparatus 3) in a power-off state include three modes of a standby mode, a low power consumption mode, and a system update mode. In a power-off state, basically, the game apparatus 3 operates while switching between two modes of the standby mode and the low power consumption mode based on a predetermined time schedule. More specifically, control is performed such that the operation mode in a power-off state basically takes the standby mode while the low power consumption mode is activated intermittently. Further, under a predetermined condition, operation can be performed in the system update mode described later.

In the standby mode, only the power supply control section 18 is supplied with power while the other hardware components are not supplied with power. This mode accepts only an operation of powering-on by a power button. The standby mode is, as it were, a standby state in which operation is being performed with standby power.

On the other hand, in the low power consumption mode, only some of the hardware components of the game apparatus 3, including the CPU 11, are supplied with power. That is, power consumption is greater than in the standby mode but is smaller than in the normal mode. In addition, since the CPU 11 is also supplied with power, information processing by the CPU 11 is also possible. Here, processes that can be executed in the low power consumption mode include, in the exemplary embodiment, processing of checking whether or not there is some update for a system or an application (whether or not some update occurs). Further, if there is such update, processing of downloading the update data from a predetermined server is also performed. That is, an operation is performed such that, during an off-period in which it appears to a user that power of the game apparatus 3 is off, download of update data for a system or an application is completed, for example. In the low power consumption mode, only hardware components necessary for such download processing are supplied with power. Specifically, in the exemplary embodiment, the CPU 11, the main memory 12, the flash memory 14, the wireless communication section 15, the controller communication section 16, and the power supply control section 18 are supplied with power. Here, in the exemplary embodiment, as described above, the CPU 11 is a triple-core multiprocessor. In the low power consumption mode, the CPU 11 operates with one core. In addition, at this time, the operation clock frequency of the CPU 11 may be decreased. In addition, the controller communication section 16 has two operation modes as described above. In the low power consumption mode, the controller communication section 16 operates in the low power mode in which only a power-on operation by the controller 5 can be accepted. That is, the low power consumption mode is an operation mode in which only the minimum required power for the download processing is supplied while the other hardware components are not supplied with power so that power consumption is suppressed as much as possible.

Figure 4:
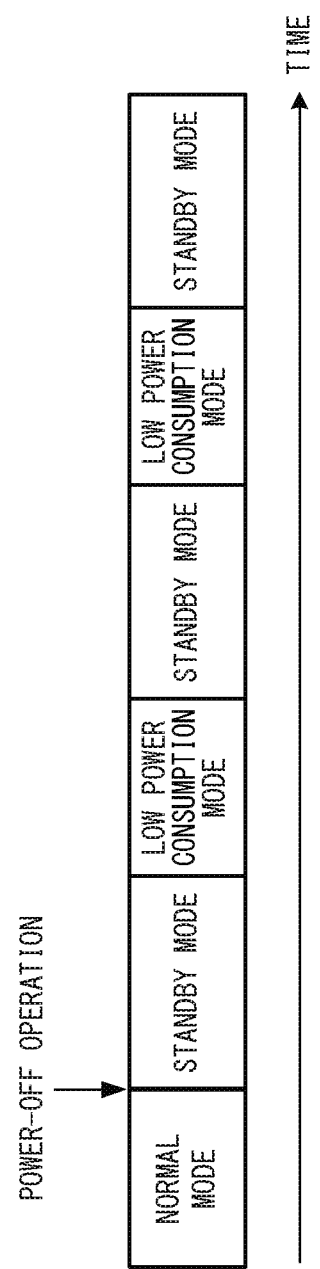
FIG. 4 is a diagram showing transition of the operation state of the game apparatus in a power-off state.

In the exemplary embodiment, in the power-off state, basically, control as shown in FIG. 4 is performed. FIG. 4 is a diagram for explaining basic operation modes of the game apparatus 3 in a power-off state. First, during operation in the normal mode, a power-off operation (shutdown operation) is performed, thereby shifting from the normal mode to the standby mode (shifting to the standby mode corresponds to so-called shutdown processing). Thereafter, when a predetermined time has elapsed, the operation mode shifts to the low power consumption mode. In this low power consumption mode, the update check processing, download processing (in the case where there is update), and the like are executed. After such processing is completed, the operation mode shifts from the low power consumption mode to the standby mode. Thereafter, when a predetermined time has elapsed, the operation mode shifts to the low power consumption mode, and then shifts to the standby mode again. Thus, when power is off, while using the standby mode as a base, the operation mode is intermittently switched to the low power consumption mode in accordance with a predetermined time schedule.

Here, data downloaded in the low power consumption mode include a data package (hereinafter, referred to as an update package) for system update of the game apparatus 3. Regarding application of the update package, conventionally, there is known a method in which download of an update package is completed in the low power consumption mode, and thereafter, when the game apparatus 3 is started in the normal mode, system update is performed. However, in the case of this method, a user is to wait until the update is finished. Particularly, in the case where the game apparatus 3 has not been powered on for a long period and then is powered on after such a long interval, and therefore there are a plurality of updates to be performed, it may take a further long time to wait until these updates are all applied. Considering the above, in the exemplary embodiment, system update is also completed while the game apparatus 3 is in a power-off state.

As described above, in the low power consumption mode, only the minimum required hardware components are supplied with power so that power consumption is reduced as much as possible. Meanwhile, the above update package may include update that causes chip rewriting for a predetermined hardware component (for example, update of a control program of a microcomputer or the like mounted on a predetermined hardware component). In the case where such a predetermined hardware component as the update target is not supplied with power in the low power consumption mode, the chip rewiring processing is not performed in the low power consumption mode, and therefore system update cannot be performed (the controller communication section 16 is assumed such that chip rewriting for the controller communication section 16 cannot be performed in the low power consumption mode). In such a case, it is conceivable to automatically shift the game apparatus 3 from the low power consumption mode to the normal mode, thereby performing system update. However, such control causes also operations such as output of a video/audio signal to the television 2. Therefore, it appears to a user that the game apparatus having been powered off is started up by itself.

Considering the above, in the exemplary embodiment, the system update mode is provided which allows a user to recognize that the game apparatus 3 is in a power-off state and meanwhile, inside the game apparatus 3, supplies power to a hardware component necessary for system update, so that the hardware condition allows a system update. After shifting to the system update mode, system update processing is performed. That is, in terms of power supply to a hardware component and its power consumption, the system update mode is regarded as being positioned between the normal mode and the low power consumption mode. That is, the order of power consumption is, from the greatest one, the normal mode, the system update mode, the low power consumption mode, and then the standby mode. More specifically, the power feeding condition in the system update mode is as follows. First, the CPU 11, the main memory 12, the flash memory 14, the wireless communication section 15, the power supply control section 18, the GPU 20, and the DSP 21 are supplied with power. In addition, the controller communication section 16 is operated in the aforementioned normal operation mode. In addition, the CPU 11 operates with all the three cores being available, as in the case of normal mode (the operation clock of the CPU 11 is also the same as in the normal mode). On the other hand, the disc drive 17 is not supplied with power (as a result, it also becomes possible to suppress occurrence of disk rotation sound whose noise value is comparatively high). In addition, although image generation processing or video output processing is performed by the GPU 20, a video signal is not outputted to the television 2. That is, the game apparatus 3 does not output a video signal to the television 2. As it were, a video signal is blocked at the AV-IC 19. The same holds true for sound. Besides, a hardware component that can become a system update target is also supplied with power.

From the above, the low power consumption mode and the system update mode can be understood as follows. That is, in the low power consumption mode, it suffices that hardware components that enable update check and download processing are supplied with power. In the system update mode, it suffices that hardware components that enable system update install are supplied with power. Therefore, in another exemplary embodiment, power consumption may be smaller in the system update mode (system update install) than in the low power consumption mode (download processing).

Here, regarding hardware components that are power supply targets in the above system update mode, for example, it is conceivable that hardware components that can become system update targets are found out in advance, and then such hardware components are set as power supply targets in the system update mode. Therefore, if the disc drive 17 can become a system update target, the disc drive 17 may also be supplied with power in the system update mode. Conversely, for example, if the wireless communication section 15 cannot become a system update target, the wireless communication section 15 may not be supplied with power in the system update mode. Further, in the system update mode, only video/audio output to an external apparatus such as the television 2 may be stopped, so that the other parts have substantially the same power feeding conditions and the same operation conditions as in the normal mode. Even in this case, since output to the television 2 is off, it appears to a user that the game apparatus 3 is in a power-off state. In addition, at least power consumption for the AV-IC 19 can be suppressed.

In the exemplary embodiment, as described above, the case where the controller communication section 16 has the normal operation mode and the low power mode is shown as an example. In another exemplary embodiment, for example, if the controller 5 is not provided with a power button, the low power mode may not be provided. In such a case, in the low power consumption mode or the standby mode, the controller communication section 16 may not be supplied with power.

In still another exemplary embodiment, instead of controlling whether or not to supply power to each hardware component as described above, control may be performed so as to change the operation state of each hardware component. For example, regarding the controller communication section 16, control may be performed so as to switch between the normal operation mode and the low power mode in accordance with whether the operation mode is the system update mode or the low power consumption mode, or control may be performed so as to change the rotation rate of a cooling fan described later. That is, in the case where each hardware component that is being supplied with power can be operated with more suppressed power consumption (its operation state can be changed), control may be performed so as to switch the hardware component into an operation state with suppressed power consumption as appropriate.

Although not shown in FIG. 2, the game apparatus 3 has an LED for indicating its operation mode. In the exemplary embodiment, the LED is lit with blue in the normal mode, lit with red in the standby mode, and lit with orange in the low power consumption mode, for example. In this case, in the system update mode, the LED is lit with orange as in the low power consumption mode. That is, the system update mode is set to externally appear to be the low power consumption mode. In another exemplary embodiment, the standby mode, the low power consumption mode, and the system update mode may be lit with the same color (for example, red).

In addition, the game apparatus 3 may be provided with a cooling fan. Regarding rotation of this fan, in the low power consumption mode, the fan may be operated with a smaller rotation rate than in the normal mode. This is because it is considered that heat generation is smaller in the low power consumption mode than in the normal mode. On the other hand, in the system update mode, the fan may be operated with the same rotation rate as in the normal mode. This is because heat generation is greater than in the low power consumption mode, or in some cases, can be as great as in the normal mode.

Here, FIG. 5 shows an example of a power-feed on/off condition and an operation condition of each hardware component of the game apparatus 3 in each mode. As shown in FIG. 5, the above four operation modes are different in power consumption in the game apparatus 3. For example, in the normal mode, all the hardware components are supplied with power. On the other hand, in the standby mode, only the power supply control section 18 and the controller communication section 16 are supplied with power. It is noted that the controller communication section 16 operates in the aforementioned low power mode (in which only power-on operation is acceptable). In the low power consumption mode, as described above, only hardware components necessary for execution of update check and download processing are supplied with power. That is, the CPU 11 and memory-related components, and also the wireless communication section 15 and the power supply control section 18 which are necessary in communication with a server, are supplied with power. In addition, also the controller communication section 16 is supplied with power, and operates in the aforementioned low power mode. In addition, since processing load in download processing is comparatively low, the operation mode of the CPU 11 is a single-core operation. Thus, while power consumption is suppressed to the minimum required amount, the update check or the download processing can be executed. In the system update mode, hardware components necessary for execution of system update processing are supplied with power. In addition, the CPU 11 performs triple-core operation, and the controller communication section 16 operates in the normal operation mode. Therefore, while power consumption is suppressed as compared to the normal mode, system update install can be performed. In this mode, since there is no output to the television, a user is allowed to recognize that the game apparatus 3 is in a power-off state. Thus, the game apparatus 3 operates while switching among these operation modes as appropriate, thereby saving power.

In the exemplary embodiment, it is assumed that it is not necessary to obtain user's agreement at the timing of performing the above system update. For example, a configuration in which comprehensive permission for system update is obtained from a user in advance is used. Therefore, in the exemplary embodiment, it is possible to install update or automatically execute the updated system, without asking for a user's operation.

Figure 6:
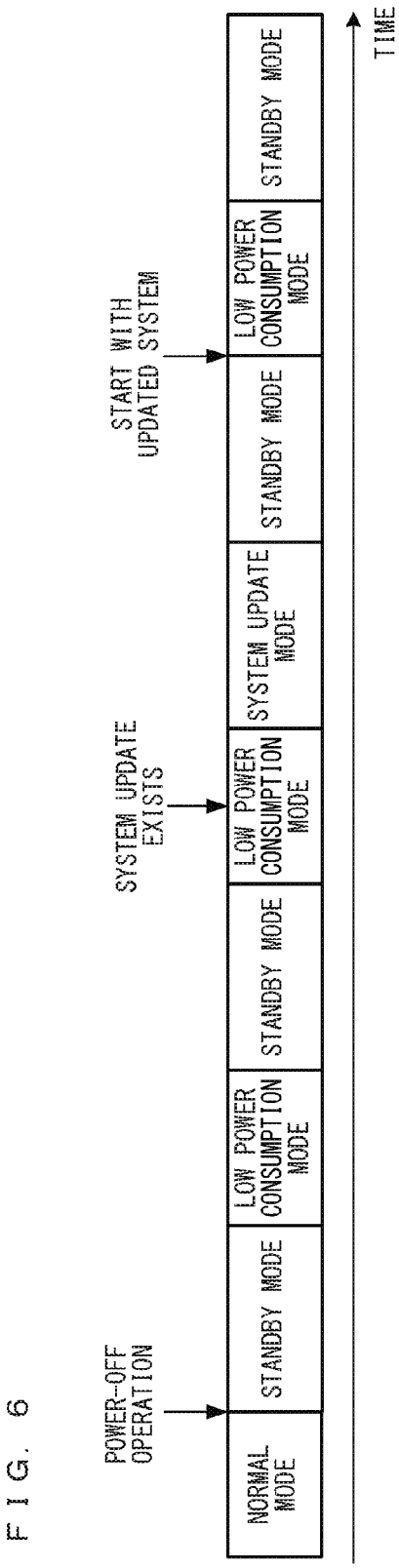
FIG. 6 is a diagram showing transition of the operation state of the game apparatus in a power-off state.

The system update mode can be started only when update check in the low power consumption mode determines that system update occurs. Specifically, as a result of update check in the low power consumption mode, if system update occurs, control is performed so as to download the update package, shift from the low power consumption mode to the system update mode, and then execute the system update. FIG. 6 shows an operation concept in such a case. First, when a power-off operation is performed during operation in the normal mode, the operation mode shifts from the normal mode to the standby mode. Thereafter, when a predetermined time has elapsed, the operation mode shifts to the low power consumption mode. It is assumed that in the low power consumption mode at this time, as a result of update check, system update is not found. In this case, the operation mode shifts from the low power consumption mode to the standby mode. Thereafter, when a predetermined time has elapsed, the operation mode shifts to the low power consumption mode again. It is assumed that in this low power consumption mode, system update is found. As a result, in this low power consumption mode, an update package is downloaded, and then the operation mode shifts to the system update mode. Then, system update processing based on the update package is performed, and then the operation mode shifts to the standby mode. Thereafter, when a predetermined time has elapsed, the operation mode shifts to the low power consumption mode again. At this time, the game apparatus 3 is to operate with the updated system. That is, after system update, restart is also automatically performed. In addition, download processing is also automatically performed in the low power consumption mode as described above. Therefore, convenience for users in such download and system update install can be improved.

After the game apparatus 3 has operated in the system update mode, the game apparatus 3 shifts to the standby mode once (that is, shut down), irrespective of a result of the update install processing. Then, when a predetermined time has elapsed, the operation mode shifts to the low power consumption mode, irrespective of a result of the update install processing. Even in the case where, while the update install is not completed for some reason, the system update processing is ended and the operation mode shifts to the standby mode, the operation mode next shifts to the low power consumption mode without shifting to the system update mode. Then, as necessary, control is performed so as to shift from the low power consumption mode to the system update mode, to restart the uncompleted update install.

Here, things that can be contained in the update package, that is, targets of "system update" include the following.

A) Update data for a basic control system (so-called OS, firmware, etc., hereinafter, may be referred to as a system file) of the game apparatus 3.

B) Update data for a control program or the like written on a chip of each hardware component. The hardware components in this case include the controller 5. For example, in the case where the controller 5 is a type as shown in FIG. 3 and a control program for the LCD 71 or the like of the controller 5 is written on a chip (microcomputer) of the controller 5 itself, data for updating this chip is also included in the update data.

C) Update data for an application (as it were, a preinstalled application or the like provided by a maker) commonly installed in the game apparatuses 3 which can be produced in large numbers.

On the other hand, update data for an application installed onto the game apparatus 3 by a user's operation, for example, a game or the like purchased at an Internet shopping site and downloaded by a user, is not included in system update packages as described above. Hereinafter, such an application other than a system may be referred to as a user application.

In update check in the low power consumption mode, both system update and update for the other application (user application) may be found. In this case, system update processing is preferentially performed. For example, only update package download and system update may be performed first, and then, in the updated system, download of update data for the other application and the update processing may be performed. Alternatively, after only the update package and the update data for the application may be downloaded in advance, the system update processing may be executed first, and then, in the updated system, the update processing for the application may be performed.

System update processing in the exemplary embodiment is performed generally as follows. The update package is generated in a compressed state. Therefore, first, processing of decompressing the update package downloaded into the flash memory 14 and storing the data into the main memory 12 is executed. Then, based on the decompressed data, processing of rewriting a chip of a predetermined hardware component, processing of updating a system file of the game apparatus 3, or the like is executed as described above. Specifically, update of a system file in the exemplary embodiment is as follows. First, it is assumed that update data for control system contained in the update package is not differential data but contains data of the entire control system (updated version). In addition, it is assumed that the name of a folder (stored in the flash memory 14) in which the current system file is stored is "SYSTEM", as an example. Under these assumptions, the updated system file contained in the update package is extracted and decompressed, and then stored into a folder named "NEWSYSTEM", for example. Then, processing of deleting the above "SYSTEM" folder and changing the name of the "NEWSYSTEM" folder to "SYSTEM" is performed. Thus, the system of the game apparatus is replaced by the updated system. Thereafter, when the game apparatus 3 is restarted, the game apparatus 3 operates with the updated system. Hereinafter, the processing until the system file for update is stored into the "NEWSYSTEM" folder is referred to as "install". Specifically, processing of rewriting a chip of a hardware component, updating a common application, and storing a system file into the flash memory 14 (the above "NEWSYSTEM") is referred to as "install". Processing for the folder name change performed thereafter is referred to as "reflection of update".

As described above, targets of "system update" also include an application commonly installed in game apparatuses. For example, it is assumed that there are two update targets of "OS" and "menu application". In this case, first, update of "OS" is executed, and the update of "OS" is reflected. Thereafter, update of "menu application" is executed, and the update of "menu application" is reflected. Then, after the "update" and the "reflection of update" of these two update targets have been performed, the game apparatus 3 is restarted. That is, in the case where there are a plurality of software components as targets of "system update", "update" and "reflection of update" may be performed on a component by component basis.

The specific content of the update processing is not limited to the above example. For example, it is assumed that data constituting a control system is composed of plural kinds of data. As an example, it is assumed that the control system is constituted by three kinds of data of (A) OS, (B) data group 1 necessary for OS, and (C) data group 2 necessary for OS. In this case, it is also possible to update the control system by updating only (B) data group 1 necessary for OS. That is, update data to be downloaded may include only (B) data group 1 necessary for OS, and only this data group 1 may be updated. That is, update processing may be performed so as to perform replacement on a data-by-data basis. Besides, instead of using an intermediate working folder such as the "NEWSYSTEM" folder, update processing may be performed so as to directly replace the file in the "SYSTEM" folder.

In the exemplary embodiment, during execution of download or update install in the power-off state as described above, if a user performs a power-on operation, the following operation is performed. First, in the case where a power-on operation is performed during download of an update package in the low power consumption mode, the download is interrupted once. Then, after the operation mode shifts to the normal mode, the interrupted download is restarted as background processing. After the download is completed, for example, a user may be notified that there is update data for system, and system update install may be performed in the normal mode by a user's operation. Alternatively, the next time the game apparatus shifts to a power-off state, the update install may be performed in the system update mode.

On the other hand, in the case where a power-on operation is performed during execution of update install in the system update mode, the operation mode shifts to the normal mode while the processing of update install is continued. Specifically, each hardware component that has not been supplied with power is also supplied with power, and output of video and audio to the television 2 is also performed (in the case where the LED is provided, the LED is lit with a color that indicates the normal mode). As a result, in a user's viewpoint, a screen is displayed on the television 2 by the power-on operation, and on the screen, for example, a progress of the system update install is displayed (for example, a progress bar is displayed). In this case, a user cannot use the game apparatus 3 until the processing of update install is finished.

Next, with reference to FIGS. 7 to 11, the operation of the game apparatus 3 in the exemplary embodiment will be described in more detail.

Figure 7:
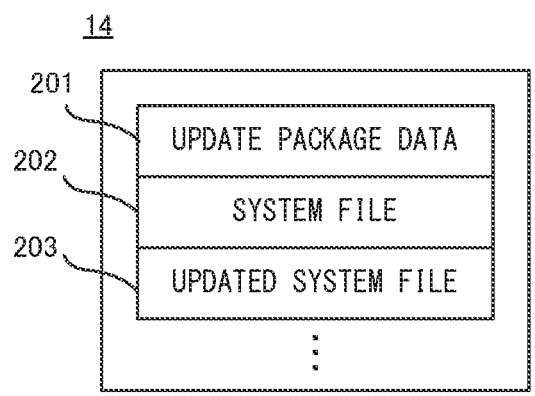
FIG. 7 is an example of data used in the exemplary embodiment.
Figure 8:
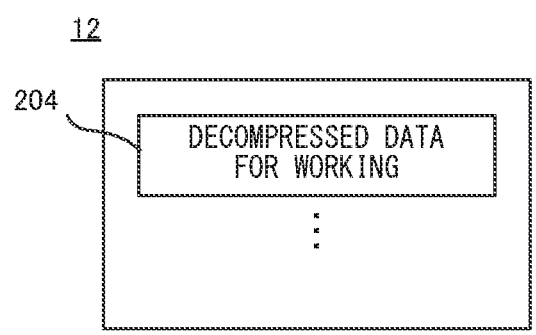
FIG. 8 is an example of data used in the exemplary embodiment.

FIG. 7 shows an example of data stored in the flash memory 14 of the game apparatus 3. FIG. 8 shows an example of data stored in the main memory 12. In the flash memory 14, update package data 201, a system file 202, an updated system file 203, and the like are stored. In the main memory 12, data necessary for processing, such as decompressed data 204 for working, is stored as appropriate.

The update package data 201 is data in an update package obtained by download from a predetermined server. Various kinds of update data are compressed and packaged as the update package data. The system file 202 is a system file that is yet to be updated, that is, a system file for the system that is currently operating. For example, the system file 202 is a system file (data group) stored in the aforementioned "SYSTEM" folder. The updated system file 203 is an updated system file extracted from the update package data. For example, the updated system file 203 is a data group stored in the aforementioned "NEWSYSTEM" folder.

The decompressed data 204 for working is data obtained by decompressing the update package data 201. The decompressed data 204 includes data as a base of the updated system file, and various kinds of update data to be written into a chip of a hardware component.

Figure 10:
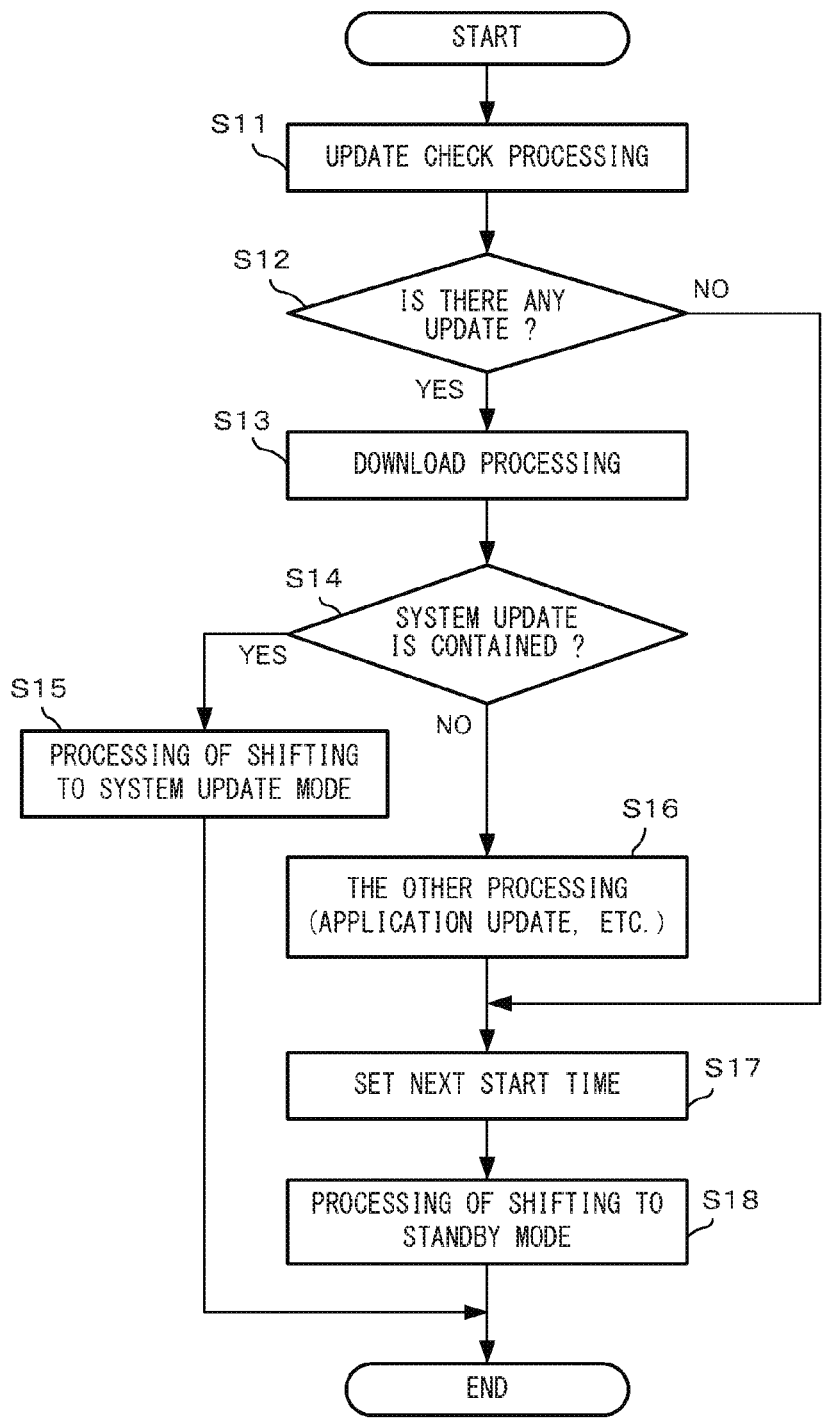
FIG. 10 is a flowchart showing the detailed operation of the game apparatus in a low power consumption mode.
Figure 11:
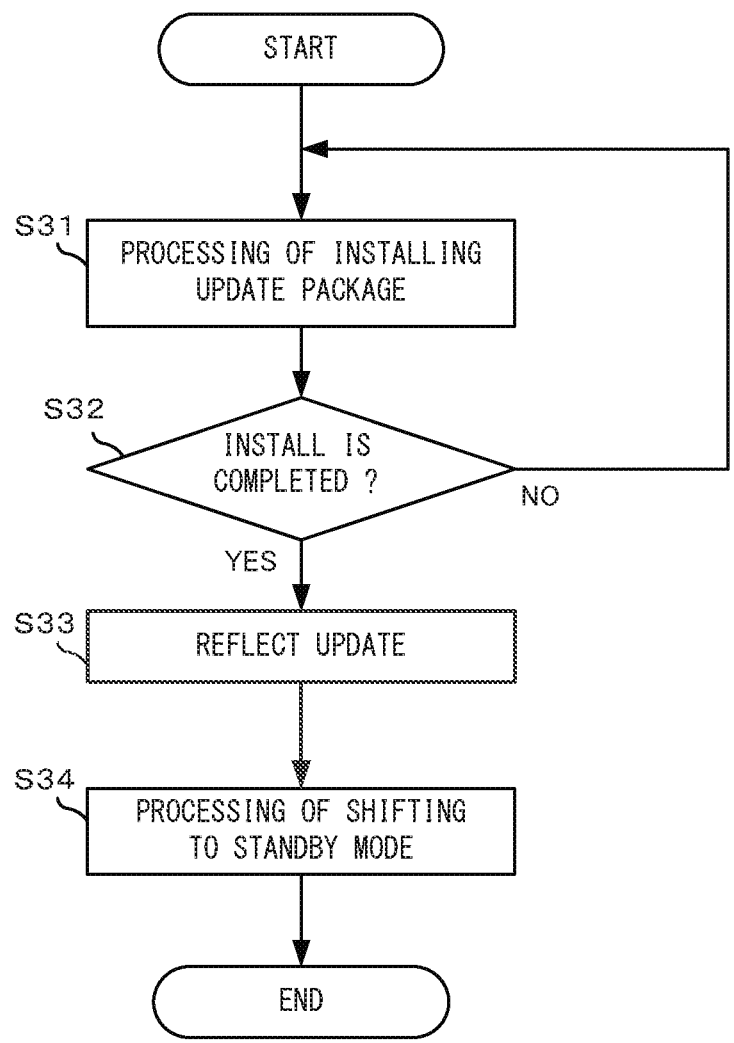
FIG. 11 is a flowchart showing the detailed operation of the game apparatus in a system update mode.

Next, with reference to flowcharts in FIGS. 9 to 11, flows of processes executed by the game apparatus 3 in a power-off state will be described.

Figure 9:
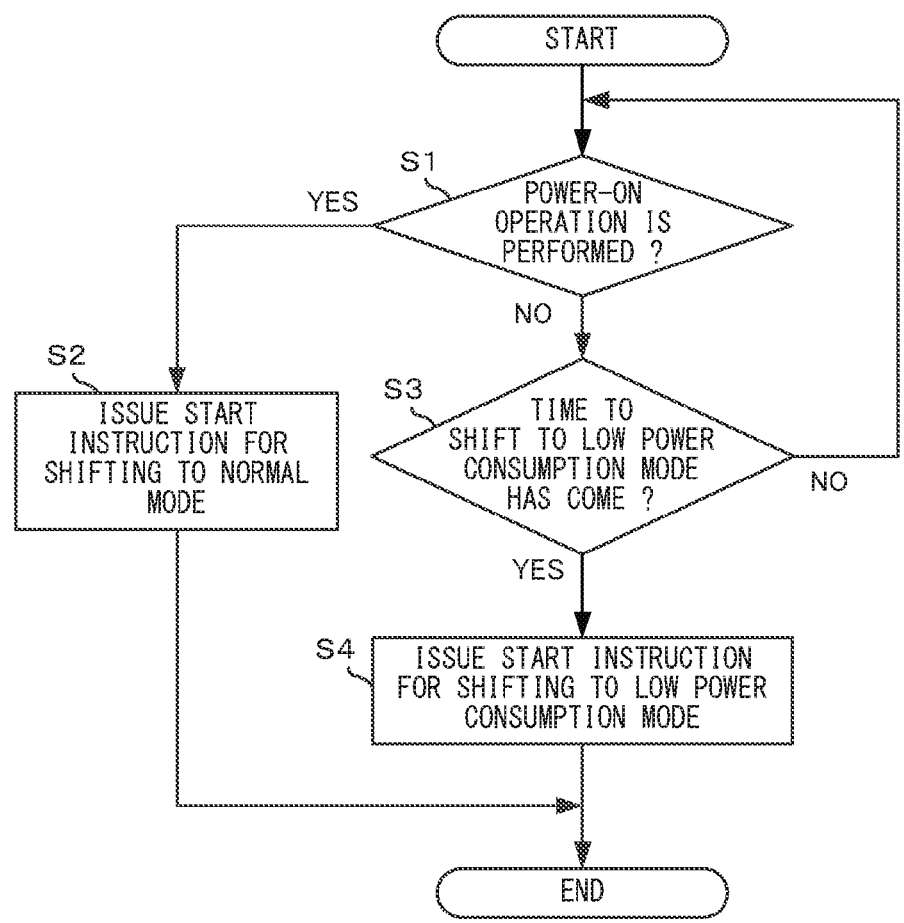
FIG. 9 is a flowchart showing the detailed operation of the game apparatus in a standby mode.

FIG. 9 is a flowchart showing the detailed operation of the game apparatus 3 in the standby mode. In the standby mode, the power supply control section 18 is a main section for execution. In FIG. 9, in step S1, the power supply control section 18 determines whether or not an operation of powering-on has been performed. As a result, if a power-on operation has been performed (YES in step S1), in step S2, the power supply control section 18 issues a boot instruction for shifting to the normal mode, to the CPU 11. As a result, the game apparatus 3 shifts to the normal mode (starts in the normal mode).

On the other hand, if a power-on operation has been performed (NO in step S1), next, in step S3, the power supply control section 18 determines whether or not the time to shift to the low power consumption mode has come, based on time measured by the RTC. As a result, if the time has come (YES in step S3), the power supply control section 18 issues a boot instruction to operate the game apparatus 3 in the low power consumption mode, to the CPU 11. As a result, power is supplied to the minimum required hardware components for operation in the low power consumption mode, such as the CPU 11, and the game apparatus 3 shifts to the low power consumption mode (starts in the low power consumption mode). On the other hand, if the time to start the low power consumption mode has not come (NO in step S3), the process returns to step S1 to repeat the process. Thus, the description of the operation of the game apparatus 3 in the standby mode is finished.

Next, the operation of the game apparatus in the low power consumption mode will be described. FIG. 10 is a flowchart showing the detailed operation of the game apparatus 3 in the low power consumption mode. In this mode, the CPU 11 is a main section for operation. First, in step S11, the CPU 11 establishes connection to a predetermined server via the wireless communication section 15, and executes processing of querying the server whether or not there is update data (both system update and application update) (update check processing). For example, processing of receiving data of an update list indicating the latest versions of each application and system is performed.

Next, in step S12, based on a result of the query, whether or not there is update data is determined. For example, the update list is compared with the version of the system of the game apparatus 3 or the version of each application installed in the game apparatus 3, thereby determining whether or not there is update data. As a result of the determination, if there is no update data (NO in step S12), the process proceeds to step S17 described later. On the other hand, if there is update data (YES in step S12), next, in step S13, the CPU 11 executes processing of downloading update data from the predetermined server.

After the download processing is finished, in step S14, the CPU 11 determines whether or not system update is included in the data downloaded at this time. This may be determined based on the update list or may be determined from the file name or the like of the downloaded data. That is, any determination method that can determine whether or not there is system update may be used.

As a result of the determination, if system update is included (YES in step S14), in step S15, the CPU 11 executes processing for shifting the operation mode of the game apparatus 3 to the system update mode. That is, processing of restarting the game apparatus 3 in the system update mode is executed. As a result, hardware components that can become system update targets are supplied with power. In addition, for example, change of the operation mode of the CPU 11 (switch from single-core operation to triple-core operation), and the like are also performed. After the game apparatus 3 is restarted in the system update mode, the process shown in FIG. 11 described later is executed.

On the other hand, as a result of the determination in step S14, if system update is not included (NO in step S14), in step S16, the CPU 11 executes the other processing as appropriate. For example, in the case where update data for application has been downloaded, application update processing is performed. Here, regarding application update, basically, processing of rewriting an application program stored in the flash memory 14 with the downloaded update data. Therefore, unlike system update in which writing on a chip of a hardware component or the like can occur, application update can be executed even in the low power consumption mode.

Next, in step S17, the CPU 11 performs processing of setting the next time to start the low power consumption mode. Thereafter, in step S18, the CPU 11 executes processing of shifting from the low power consumption mode to the standby mode.

Although not shown in the flowchart, if a power-on operation is performed before the download is completed, the download in the low power consumption mode is interrupted and processing of shifting to the normal mode is executed. Then, in the normal mode, the interrupted download is restarted as background processing.

Thus, the description of processing in the low power consumption mode is finished.

Next, with reference to FIG. 11, the detailed operation of the game apparatus 3 in the system update mode will be described. FIG. 11 is a flowchart showing the detailed operation of the game apparatus 3 in the system update mode. Also in this mode, the CPU 11 is a main section for operation.

When the game apparatus 3 has shifted to the system update mode, first, in step S31, the CPU 11 executes processing of installing an update package. Specifically, compressed update package data 201 is decompressed and stored as the decompressed data 204 for working into the main memory 12. Further, based on the decompressed data 204 for working, as described above, processing of rewriting a chip of a predetermined hardware component, processing of storing a system file for update into the flash memory 14 (for example, "NEWSYSTEM" folder), and the like are executed.

Next, in step S32, the CPU 11 determines whether or not the install is completed. As a result of the determination, if the install has not been completed yet (NO in step S32), the process returns to step S31 to continue the install processing. On the other hand, if the install has been completed (YES in step S32), in step S33, the CPU 11 performs processing for reflecting the update. That is, as described above, processing of deleting the "SYSTEM" folder and changing the name of the "NEWSYSTEM" folder to "SYSTEM" is performed. Thereafter, in step S34, the CPU 11 executes processing of shifting to the standby mode. As a result, a timing of shifting to the low power consumption mode or the normal mode after shifting to the standby mode corresponds to restart of the game apparatus 3. As a result, the game apparatus 3 is to operate with the updated system. In other words, the system update is reflected so that operation is performed with the updated system, without requiring an operation to indicate agreement or permission of a user, or the like.

Although not shown in the flowchart, when a power-on operation is performed in the system update mode, each hardware component that has not been supplied with power is also supplied with power. As a result, output of video and audio to the television 2 is also performed. That is, while the update processing is continued, all the hardware components are supplied with power, whereby the operation mode shifts to the normal mode. In addition, in this case, after the update processing is finished, the game apparatus may be restarted so as to be started in the normal mode again.

Thus, the description of the operation in the system update mode is finished.

Thus, in the exemplary embodiment, in a power-off state of the game apparatus 3, in addition to the low power consumption mode in which only some of the hardware components are supplied with power so as to perform operation with suppressed power consumption, the system update mode in which the game apparatus 3 is allowed to perform system update processing while it appears to a user that the game apparatus 3 is in a power-off state, is provided. In the system update mode, hardware components used for system update are supplied with power. Thus, in a power-off state of the game apparatus 3, system update processing can be executed without causing a user to notice the execution, and therefore convenience for a user can be enhanced while power consumption of the game apparatus 3 is suppressed.

In the above example, an update package is downloaded in the low power consumption mode, and the install thereof is performed in the system update mode. In another exemplary embodiment, both download and install of an update package may be performed in the system update mode. For example, update check described above may be performed in the low power consumption mode, and based on a result thereof, whether or not there is system update may be determined. Then, if there is system update, the operation mode may shift, at this stage, from the low power consumption mode to the system update mode. Then, in the system update mode, both download and install of an update package may be executed.

In the above exemplary embodiment, reflection of an updated system is also performed in a power-off state. In another exemplary embodiment, instead of performing update reflection in the system update mode, for example, the next time the operation mode shifts to the normal mode, a user's operation to agree with update reflection may be required. Then, when the user's agreement is obtained, processing of changing the folder name as described above may be performed and the game apparatus 3 may be restarted.

In the above exemplary embodiment, the case of using the stationary game system 1 as an example of an information processing system has been described. However, the exemplary embodiments are not limited thereto. For example, the above-described configuration can also be applied to an information processing apparatus such as a hand-held game apparatus. In addition, the above-described configuration can also be applied to an information processing apparatus or an information processing system other than a game apparatus, such as a smartphone or a so-called tablet terminal, for example.

What is claimed is:

1. An information processing apparatus configured to communicate with an external computer system via a network and operate in at least one of a plurality of different power states that include: 1) first state, 2) a second state, and 3) a third state, the information processing apparatus including multiple hardware components that operate based on installed programmatic instructions where different ones of the multiple hardware components are supplied with power or not supplied with power depending on which one of the plurality of different power states the information processing apparatus is in, the first state configured to supply power to more components than the second state and the second state configured to supply power to more components than the third state, the information processing apparatus comprising:

a processing system that includes at least one hardware processor coupled to memory, the processing system configured to:
(a) while in the first state, execute a computer application and process received user input;
(b) while in the third state, determine that at least one programmatic update for at least one of the hardware components of the information processing apparatus is available;
(c) retrieve, via the network, the programmatic update from the external computer system;
(d) switch to the second state from the third state and based on which one of the hardware components of the information processing apparatus is to be updated with the at least one programmatic update, cause power to be supplied to one or more of the hardware components not supplied with power in the third state while also maintaining at least some other ones of the multiple hardware components of the information processing apparatus in a low or no power state; and
(e) while in the second state, update or install the programmatic update to the at least one of the hardware components.

2. The information processing apparatus of claim 1, wherein the processing system configured to perform (b), (d), and (e) without relying on user input to the information processing apparatus.

3. The information processing apparatus of claim 1, wherein the hardware component supplied with power in the second state, but not in the third state, is the at least one of the hardware components that the programmatic update is updated or installed to.

4. The information processing apparatus of claim 1, wherein the processing system configured to perform (c) in the third state.

5. The information processing apparatus of claim 1, wherein the processing system is further configured to:
switch to the third state in response to completion of the update or installation of the programmatic update.

6. The information processing apparatus of claim 1, wherein the processing system is further configured to:
while in the second state and during performance of (b), (d), or (e), receive input from a user input device;
responsive to the received input, switch to the first state.

7. The information processing apparatus of claim 6, wherein, as a result of switching to the first state, performance of (b) is set as a background process performed by the processing system.

8. The information processing apparatus of claim 6, wherein (b), (d), and (e) are continued as needed after the switch to the first state.

9. The information processing apparatus of claim 1, wherein no video or audio signal is output during performance of (b), (d), and (e).

10. A non-transitory computer readable storage medium storing an information processing program for use with a computer of an information processing apparatus that is configured to communicate with an external computer system via a network and operate in at least one of a plurality of different power states that include: 1) first state, 2) a second state, and 3) a third state, the information processing apparatus including multiple hardware components that operate based on installed programmatic instructions where different ones of the multiple hardware components are supplied with power or not supplied with power depending on which one of the plurality of different power states the information processing apparatus is in, the first state configured to supply power to more components than the second state and the second state configured to supply power to more components than the third state, the information processing program comprising instructions that are configured to cause the computer to:
(a) while in the first state, execute a computer application and process received user input;
(b) while in the third state, determine that at least one programmatic update for at least one of the hardware components of the information processing apparatus is available;
(c) retrieve, via the network, the programmatic update from the external computer system;
(d) switch to the second state from the third state and based on which one of the hardware components of the information processing apparatus is to be updated with the at least one programmatic update, cause power to be supplied to one or more of the hardware components not supplied with power in the third state while also maintaining at least some other ones of the multiple hardware components of the information processing apparatus in a low or no power state; and
(e) while in the second state, update or install the programmatic update to the at least one of the hardware components.

11. The non-transitory computer readable storage medium of claim 10, wherein (b), (d), and (e) are performed without relying on user input to the information processing apparatus.

12. The non-transitory computer readable storage medium of claim 10, wherein the hardware component supplied with power in the second state, but not in the third state, is the at least one of the hardware components that the programmatic update is updated or installed to.

13. The non-transitory computer readable storage medium of claim 10, wherein (c) is performed in the third state.

14. The non-transitory computer readable storage medium of claim 10, the information processing program comprising further instructions that are configured to switch to the third state in response to completion of the update or installation of the programmatic update.

15. The non-transitory computer readable storage medium of claim 10, wherein the information processing program comprises further instructions that are configured to cause the computer to:
while in the second state and during performance of (b), (d), or (e), receive input from a user input device; and
responsive to the received input, switch to the first state.

16. An information processing method for controlling a computer of an information processing apparatus that is configured to communicate with an external computer system via a network and operate in at least one of a plurality of different power states that include: 1) first state, 2) a second state, and 3) a third state, the information processing apparatus including multiple hardware components that operate based on installed programmatic instructions where different ones of the multiple hardware components are supplied with power or not supplied with power depending on which one of the plurality of different power states the information processing apparatus is in, the first state configured to supply power to more components than the second state and the second state configured to supply power to more components than the third state, the method comprising:

(a) while in the first state, executing a computer application and processing received user input;

(b) while in the third state, determining that at least one programmatic update for at least one of the hardware components of the information processing apparatus is available;

(c) retrieving, via the network, the programmatic update from the external computer system;

(d) switching to the second state from the third state and based on which one of the hardware components of the information processing apparatus is to be updated with the at least one programmatic update, causing power to be supplied to one or more of the hardware components not supplied with power in the third state while also maintaining at least some other ones of the multiple hardware components of the information processing apparatus in a low or no power state; and (e) while in the second state, updating or installing the programmatic update to the at least one of the hardware components.

17. The method of claim 16, wherein (b), (d), and (e) are performed without relying on user input to the information processing apparatus.

18. The method of claim 16, wherein the hardware component supplied with power in the second state, but not in the third state, is the at least one of the hardware components that the programmatic update is updated or installed to.

19. The method of claim 16, further comprising switching to the third state in response to completion of the update or installation of the programmatic update.

* * * * *